United States Patent
Komorida et al.

(10) Patent No.: US 6,931,827 B2
(45) Date of Patent: Aug. 23, 2005

(54) GRASS COLLECTING APPARATUS AND A LAWN MOWER HAVING SUCH A GRASS COLLECTING APPARATUS

(75) Inventors: Takeshi Komorida, Sakai (JP); Nobuyuki Yamashita, Sakai (JP); Shoso Ishimori, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 10/645,311

(22) Filed: Aug. 21, 2003

(65) Prior Publication Data

US 2004/0112027 A1 Jun. 17, 2004

(30) Foreign Application Priority Data

Sep. 26, 2002 (JP) ........................................ 2002-281438

(51) Int. Cl.⁷ ........................ A01D 43/00; A01D 43/06
(52) U.S. Cl. ........................................................ 56/202
(58) Field of Search ............................ 56/202, 16.6, 7, 56/200, 203, 204, 205, 13.3

(56) References Cited

U.S. PATENT DOCUMENTS

| | | | | |
|---|---|---|---|---|
| 3,757,503 A | * | 9/1973 | Soldavini | 56/202 |
| 3,893,284 A | * | 7/1975 | Thon et al. | 56/202 |
| 4,149,363 A | * | 4/1979 | Woelffer et al. | 56/202 |
| 4,152,884 A | * | 5/1979 | Gandrud et al. | 56/202 |
| 4,487,007 A | * | 12/1984 | Mullet et al. | 56/16.6 |
| 4,637,203 A | * | 1/1987 | Fedeli | 56/202 |
| 4,731,983 A | * | 3/1988 | Yuki et al. | 56/202 |
| 4,736,575 A | * | 4/1988 | Fedeli | 56/202 |
| 4,984,420 A | * | 1/1991 | Samejima et al. | 56/203 |
| 5,921,073 A | | 7/1999 | Cash | |
| 6,012,273 A | * | 1/2000 | Ogasawara et al. | 56/16.6 |
| 6,050,072 A | | 4/2000 | Chabrier et al. | |
| 6,360,517 B1 | * | 3/2002 | Ishimori et al. | 56/320.1 |
| 6,591,596 B2 | * | 7/2003 | Mauzizio et al. | 56/16.6 |
| 6,672,043 B2 | * | 1/2004 | Shibata et al. | 56/202 |
| 6,688,091 B2 | * | 2/2004 | Ishimori | 56/22 |

FOREIGN PATENT DOCUMENTS

| | | | |
|---|---|---|---|
| JP | 03-004714 A2 | 1/1991 | |
| JP | 2001045829 A | * 2/2001 | A01D/34/63 |
| JP | 2001-275438 | 10/2001 | |
| WO | WO 92/13438 | 8/1992 | |

* cited by examiner

*Primary Examiner*—Árpád Fábián Kovács
(74) *Attorney, Agent, or Firm*—The Webb Law Firm

(57) ABSTRACT

A grass collecting apparatus for directing grass clippings cut by a mower unit to a grass catcher. The apparatus includes a grass collecting duct for guiding the grass clippings from the mower unit to the grass catcher, the duct having an outlet portion leading to the grass catcher defined by an upper plate, right and left side plates and a bottom plate, a gate-shaped frame disposed in a boundary between the outlet portion of the grass collecting duct and an opening of the grass catcher, and a swing mechanism for swinging the grass catcher between a grass collecting position and a grass discharging position. The bottom plate is arranged to receive the grass clippings falling off an area when the grass catcher is in the grass collecting position, and is displaced with a surface being tilted when the grass catcher is swung from the grass collecting position to the grass discharging position.

15 Claims, 12 Drawing Sheets

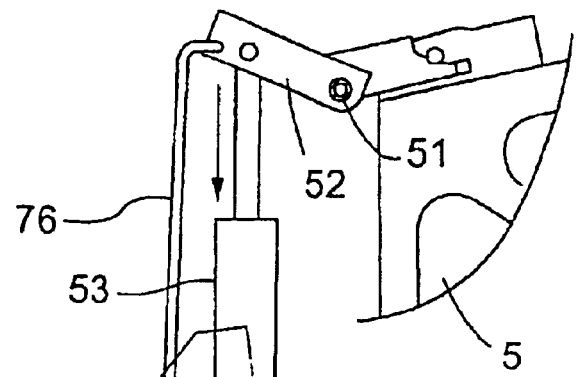
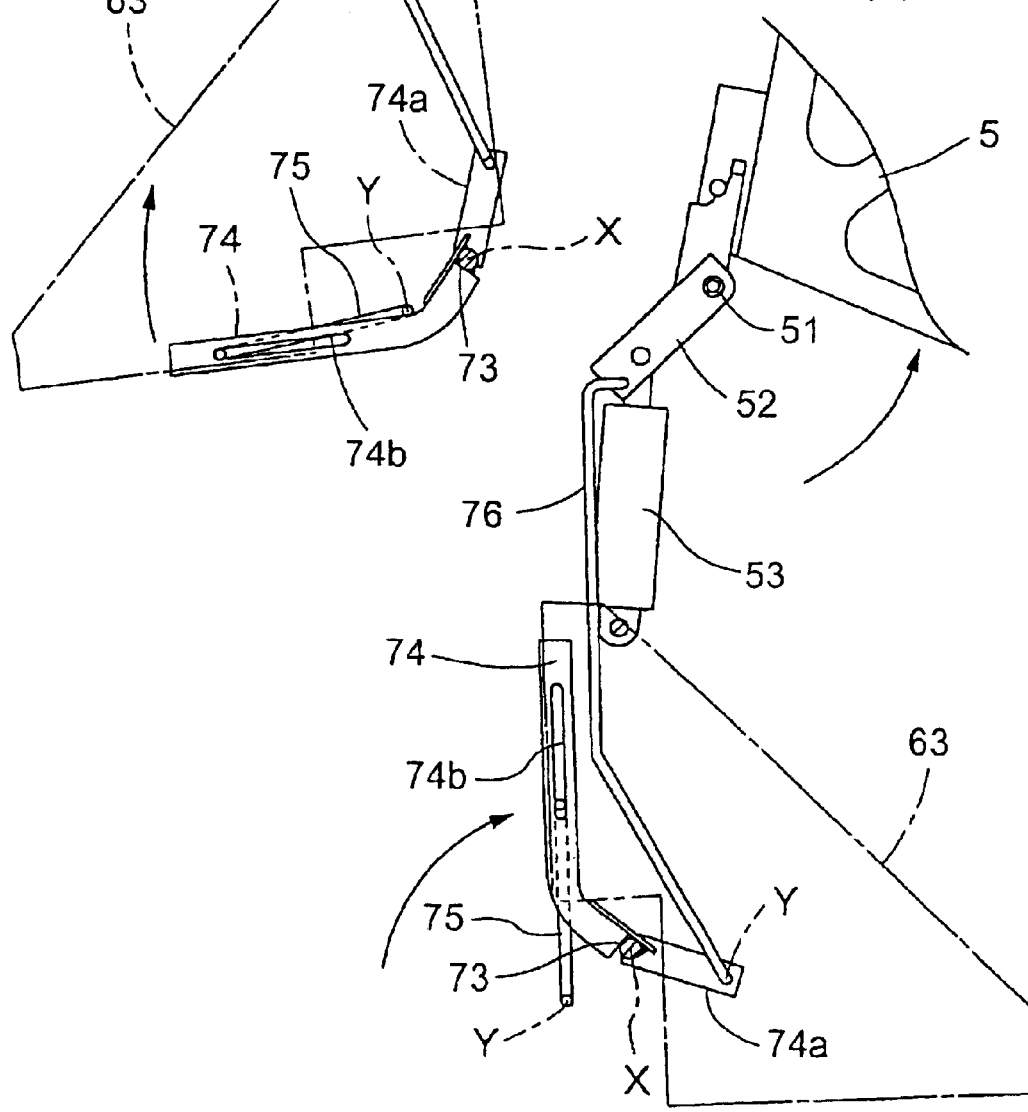

GRASS COLLECTING APPARATUS AND A LAWN MOWER HAVING SUCH A GRASS COLLECTING APPARATUS

BACKGROUND OF THE INVENTION

1. Field of the Invention

The present invention relates to a grass collecting apparatus for directing grass clippings cut by a mower unit to a grass catcher and to a lawn mower having such a grass collecting apparatus.

2. Description of the Related Art

Under certain circumstances where grass clippings cut by a mower unit are not allowed to be directly discharged, the grass clippings need to be temporarily stored in a grass catcher through a grass collecting duct or the like. A lawn mower having such a grass collecting apparatus travels to a predetermined grass clippings dumping area when a predetermined amount of grass clippings has accumulated in the grass catcher to discharge the grass clippings from the grass catcher. In order to prevent the grass clippings from falling off an opening of the grass catcher and scattering outside the grass clippings dumping area before the grass catcher reaches a predetermined position in time of discharging the grass clippings, various devices have been proposed.

For example, Japanese Patent Application "Kokai" No. 03-004714 discloses a grass collecting apparatus comprising a lid member and a guide member openable and closable by the lid member, both provided in an opening of a grass catcher. During a mowing operation, the lid member is closed to store grass clippings directed from a duct in a grass catcher through the guide member in a guiding position. In time of discharging the grass clippings, the grass catcher is pulled off the duct of the lawn mower and carried to a grass clippings dumping area. Then, the lid member is pivoted and opened while the guide member is also pivoted to an open position to leave a large opening for discharging the grass clippings from the grass catcher.

Instead of the construction requiring the operator to carry the grass catcher to the grass clippings dumping area, an arrangement has been proposed in which the lawn mower moves to the grass clippings dumping area where the grass clippings are discharged from the grass catcher. One example of such a lawn mower is known from Japanese Patent Application "Kokai" No. 2001-275438. This lawn mower comprises a vertically movable link mechanism, a grass container connected to the vertically movable link mechanism to be pivotable about a transverse support shaft to switch between a grass collecting position and a grass discharging position, an openable and closable lid provided in the grass container to be pivotable about a transverse support shaft for opening and closing an opening formed at a rear end of the grass container, a hydraulic cylinder extending between the vertically movable link mechanism and the grass container for switching the position of the grass container, and a link mechanism disposed between the vertically movable link mechanism and the openable and closable lid for opening and closing the lid in response to the switching operations of the position of the grass container. The grass container is switched from the grass collecting position to the grass discharging position when in a raised position remote from the grass collecting duct, thereby to discharge the grass clippings from the grass container. In this type of lawn mower, however, backlash may be produced in the link mechanism interlocked with the switching operations of the position of the grass container for opening and closing the lid. As a result, grass clippings sometimes fall off between the grass container and the openable and closable lid during running of the lawn mower.

Further, U.S. Pat. No. 6,050,072 discloses a lawn mower comprising a movable flap disposed in an area between a grass collecting duct and a grass catcher. The movable flap is displaced to a position to close an opening of the grass catcher when the grass catcher is raised away from the grass collecting duct, thereby to prevent grass clippings from being inadvertently discharged from the opening of the grass catcher. In this type of lawn mower also, the grass clippings could fall off between the closed movable flap and the opening of the grass catcher unless the movable flap has a precisely manufactured displacement mechanism.

SUMMARY OF THE INVENTION

The present invention has been made having regard to the state of the art noted above, and its object is to provide a grass collecting apparatus for directing grass clippings cut by a mower unit to a grass catcher through a grass collecting duct in which grass clippings falling off between the grass collecting duct and the grass catcher are prevented from scattering in other areas than a grass clippings dumping area.

In order to fulfill the above-noted object, a grass collecting apparatus for directing grass clippings cut by a mower unit to a grass catcher according to the present invention comprises a grass collecting duct for guiding the grass clippings from the mower unit to the grass catcher, the duct having an outlet portion leading to the grass catcher defined by an upper plate, right and left side plates and a bottom plate, a gate-shaped frame disposed in a boundary between the outlet portion of the grass collecting duct and an opening of the grass catcher, and a swing mechanism for swinging the grass catcher between a grass collecting position with the opening of the grass catcher being opposed to the gate-shaped frame and a grass discharging position with the opening of the grass catcher being directed downward, wherein the bottom plate provided in the outlet portion is arranged to receive grass clippings falling off an area around the gate-shaped frame when the grass catcher is in the grass collecting position, and the bottom plate provided in the outlet portion is displaced to a position with a surface thereof being tilted when the grass catcher is swung from the grass collecting position to the grass discharging position.

With this construction, the bottom plate provided in the outlet portion of the grass collecting duct receives the grass clippings sometimes falling off the area around the gate-shaped frame provided in the boundary between the outlet portion of the grass collecting duct and the opening of the grass catcher. The grass catcher is swung from the grass collecting position to the grass discharging position in the grass clippings dumping area to tilt the surface of the bottom plate, thereby to allow the grass clippings accumulated on the surface of the bottom plate to slip off to the grass clippings dumping area.

More particularly, according to the grass collecting apparatus of the present invention, while grass clippings are permitted to some extent to fall off between the grass collecting duct and the grass catcher, the bottom plate is provided having the surface to receive the falling grass clippings and allowing the surface thereof to tilt in the grass clippings dumping area thereby to reliably discharge the grass clippings accumulated on the surface thereof in the grass clippings dumping area. This can prevent the grass clippings falling off between the grass collecting duct and the grass catcher from scattering to other areas than the grass clippings dumping area without requiring accuracy in assembling the components of the grass collecting apparatus to the extent of increasing manufacturing cost.

According to one of the preferred embodiments of the present invention, the grass catcher is supported to the gate-shaped frame through the swing mechanism. With this construction, the grass catcher is selectively swingable about the gate-shaped frame acting as a pivotal point to switch between the grass collecting position with the opening thereof being opposed to the outlet portion of the grass collecting duct and the grass discharging position with the opening thereof being directed downward to the grass clippings dumping area. The bottom plate provided in the outlet portion for receiving the falling grass clippings is also supported by the gate-shaped frame to be displaceable thereby to precisely determine the positional relationship between the opening of the grass catcher and the bottom plate with respect to the gate-shaped frame acting as a positioning reference member.

Since it is necessary to discharge the grass clippings stored in the grass catcher as well as the grass clippings accumulated on the bottom plate to the grass clippings dumping area, it is preferable that the bottom plate is swingable by the swing mechanism as interlocked to swinging of the grass catcher from the grass collecting position to the grass discharging position.

The outlet portion of the grass collecting duct includes the upper plate, right and left side plates and bottom plate. The bottom plate having an increased length may interfere with the upper plate at a front end thereof when the bottom plate is oscillated. Taking into consideration that the greater the length of the bottom plate becomes, the greater ability to receive the falling grass clippings can be expected, it would be sometimes extremely advantageous to employ a construction having the bottom plate with a pivotal axis thereof being displaced downward with pivotal movement thereof to a tilted position.

In order to prevent the gate-shaped frame from disadvantageously affecting a flow of the grass clippings as a relay portion between the grass collecting duct and the grass catcher, another preferred embodiment of the present invention provides a passing-through opening, through which the opening of the grass catcher in the grass collecting position communicates with the outlet portion of the grass collecting duct.

As a preferred embodiment of a self-propelled lawn mower having the grass collecting apparatus according to the present invention, it is proposed that the mower unit is mounted forwardly of rear wheels, the gate-shaped frame is disposed at a rear portion of the vehicle body, and the grass catcher protrudes rearwardly from the vehicle body. With such a construction, the lawn mower has no protruding portion at lateral sides thereof to provide an excellent steering efficiency in mowing operations.

Where the deck of a truck acts as the grass clippings dumping area, the discharged grass clippings can easily be transported to any other grass clippings disposal sites. In order to discharge the grass clippings stored in the grass catcher and the grass clippings accumulated on the bottom plate to the deck of the truck from above, a lawn mower according to a preferred embodiment of the present invention includes a vertically movable link mechanism for vertically moving the gate-shaped frame supporting the grass catcher and the bottom plate relative to the vehicle body.

Other features and advantages of the present invention will be apparent from the following description to be taken with reference to the accompanying drawings.

BRIEF DESCRIPTION OF THE DRAWINGS

FIG. 11 is explanatory views showing a pivotal movement from the grass clippings collecting position to a grass clippings discharging position.

DESCRIPTION OF THE PREFERRED EMBODIMENTS

Figure 1:
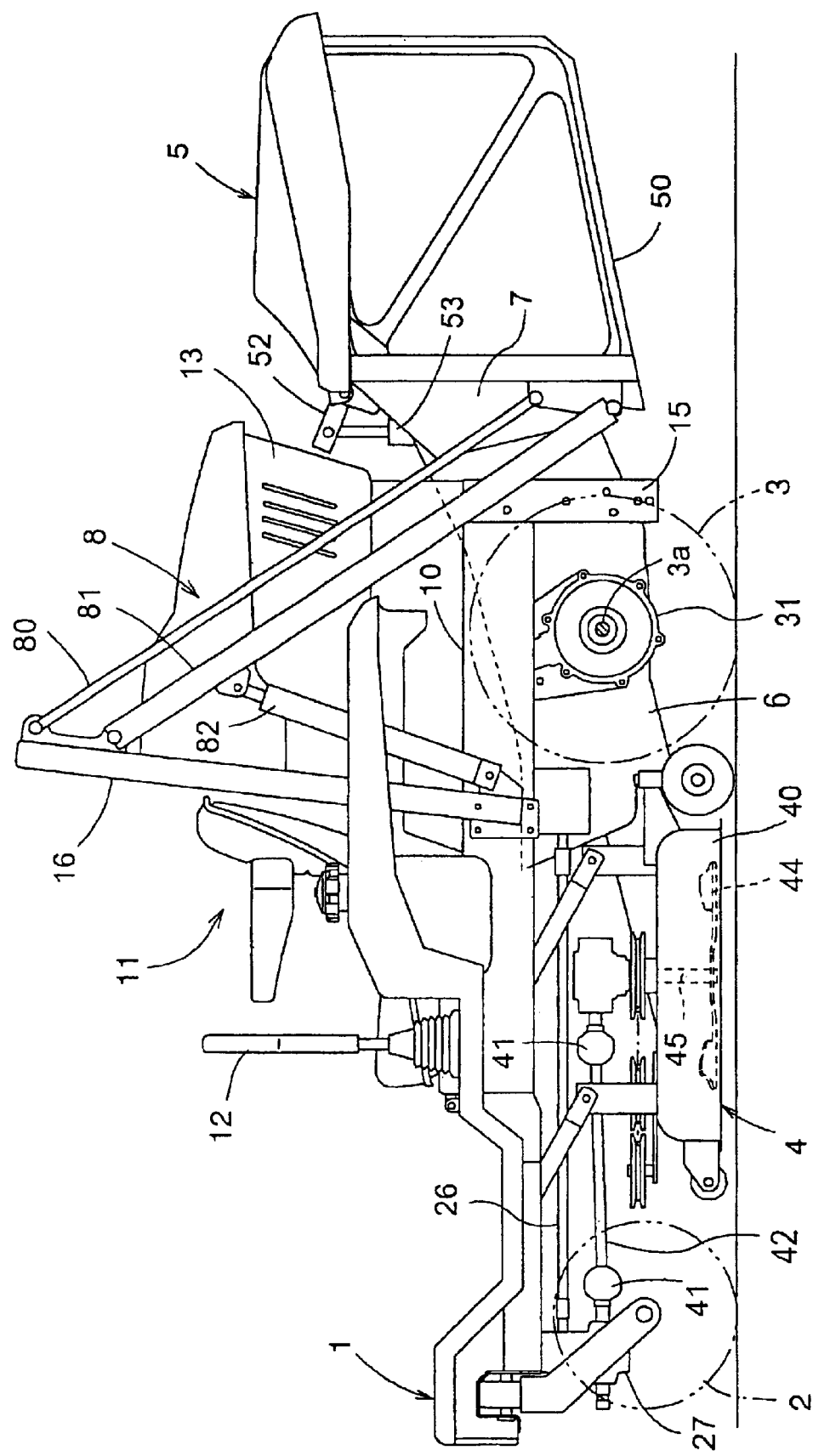
FIG. 1 is a side elevation of a lawn mower including a grass collecting apparatus according to the present invention.

FIG. 1 is a side elevation of a lawn mower of the mid-mount mower type. The mower comprises a vehicle body 1 including longitudinally extending frames, a pair of right and left caster-type rollers 2 acting as front wheels disposed at the front of the vehicle body 1, a pair of right and left drive wheels 3 acting as rear wheels disposed at the rear of the vehicle body 1, a mower unit 4 provided between the front wheels 2 and rear wheels 3 to be vertically movable, and a grass catcher 5 provided rearwardly of the vehicle body 1. Body frames 10 acting as principal elements of the vehicle body 1 basically consist of a pair of right and left longitudinally extending belt-like profile members.

Grass clippings produced at the mower unit 4 are guided by a grass collecting duct 6 extending between the pair of right and left rear wheels 3 to accumulate in the grass catcher 5. The grass collecting duct 6 and the grass catcher 5 are interconnected by a gate-shaped frame 7.

The vehicle body 1 has a driver's seat 11 disposed over the mower unit 4, and shift levers 12 at the right and left sides of the driver's seat 11. An engine 13 is mounted in an upper, transversely middle position of the vehicle body 1 rearwardly of the driver's seat 11.

As best understood from FIGS. 2 through 4, drive is transmitted from the engine 13 through a ball joint 14 that allows displacements of a transmission axis due to vibration, to an input shaft 21 of a transmission case 20 disposed below and forwardly of the engine 13. In the transmission case 20, drive is transmitted from the input shaft 21 through three spur gears 22 to a drive distributing mechanism 23. From this drive distributing mechanism 23 propelling drive is transmitted through a pair of bevel gears 24a and a transversely extending relay shaft 24 to right and left HSTs (hydrostatic stepless transmissions) 30. Drive having undergone a change speed operation by each of the right and left HSTs is transmitted to an axle 3a of the corresponding right or left drive wheel 3 through a reduction mechanism 32 mounted in a right or left axle case 31. More particularly, each of a pair of right and left change speed devices for transmitting drive to each of the right and left drive wheels 3 includes the stepless transmission 30 and the reduction mechanism 32.

Drive from the engine 13 is transmitted independently to the axles 3a of the right and left drive (rear) wheels 3 through the corresponding right and left HSTs 30. The right and left shift levers 12 are linked to the corresponding right and left HSTs 30, respectively, and are operable to shift the right and left HSTs 30 independently of each other. The lawn mower is switchable between a straight running state with the right and left HSTs 30 providing the same speed to rotate the right and left drive wheels 3 at equal speed, and a turning state with the right and left HSTs 30 providing different speeds to rotate the right and left drive wheels 3 at different speeds. Since the HSTs 30 are switchable between forward drive and backward drive, the turning state includes a large turning state produced when the right and left drive wheels 3 are driven in the same direction, a pivot turning state produced when one of the right and left drive wheels 3 is stopped, and a spin turning state produced when the right and left drive wheels 3 are driven in opposite directions.

Figure 4:
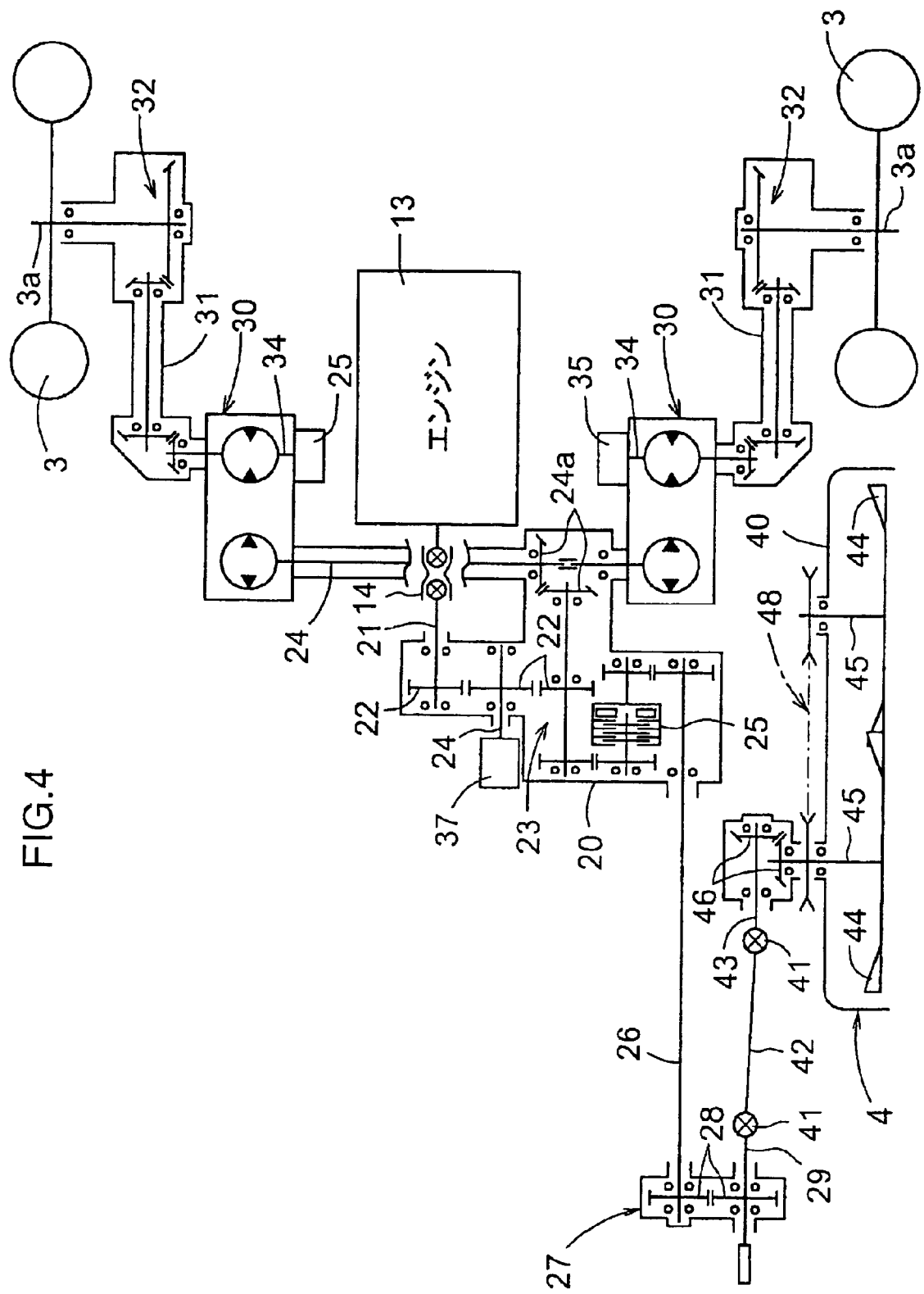
FIG. 4 is a schematic view of a transmission system of the lawn mower shown in FIG. 1.

As illustrated in FIG. 4, the drive distribution mechanism 23 is provided with a multi-disk type working clutch 25 for transmitting and breaking working power. The working power emerging from the working clutch 25 is transmitted through a first transmission shaft 26 extending fore and aft and a pair of spur gears 28 mounted in a front case 27 at the front of the vehicle body 1 to a power takeoff shaft 29. From the rear end of this power takeoff shaft 29 power is transmitted through a pair of ball joints 41 and a second transmission shaft 42 extending fore and aft to an input shaft 43 of the mower unit 4.

Power may be taken also from the forward end of the power takeoff shaft 29. By using the forward end of this power takeoff shaft 29, though not shown in the drawings, power may be transmitted easily to an auxiliary working implement attached to the front of the vehicle body 1.

The mower unit 4 has a housing 40 containing a pair of right and left grass cutting blades 44 rotatable about vertical support shafts 45. The working power transmitted to the input shaft 43 is transmitted to one of the support shafts 45 through a pair of bevel gears 46, and then transmitted from this support shaft 45 to the other support shaft 45 through a belt transmission mechanism 48. The right and left blades 44 are thereby driven to rotate in opposite directions at the same speed, with rotating tracks partly overlapping each other, and the blades moving backward in the overlapping location. The rotating blades 44 cut grass and generate carrier air flows. The air flows entrain and transport grass clippings to a discharge opening formed in a transversely middle position of a rear wall of the housing 40. The grass clippings are discharged through the discharge opening to the grass collecting duct 6.

Figure 3:
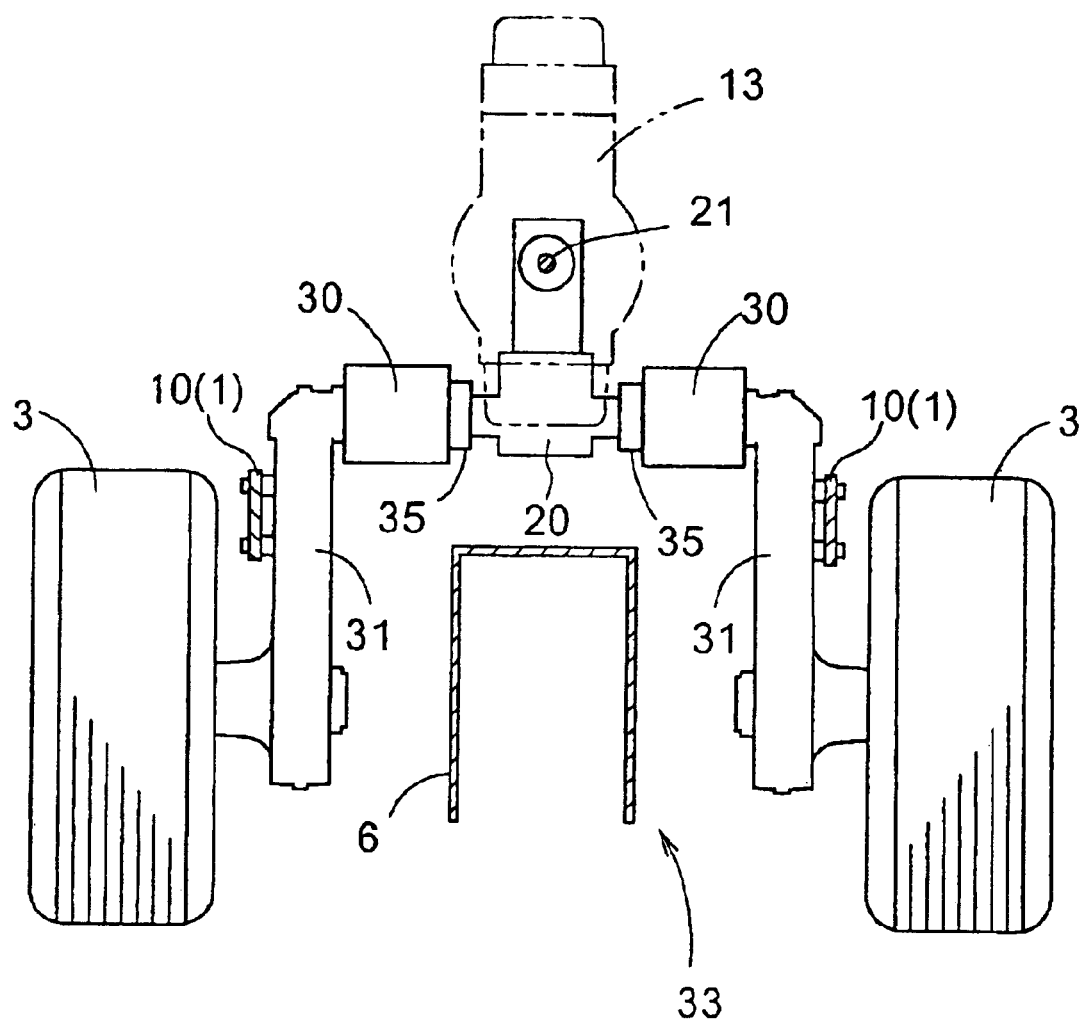
FIG. 3 is a rear view of a principal portion of the lawn mower shown in FIG. 1.

As apparent from FIGS. 3 and 4, the right and left HSTs 30 and axle cases 31 are arranged right and left symmetrical positions opposed to each other across the drive distributing mechanism 23 disposed in the middle position transversely of the body frames 10. Thus, the drive distributing mechanism 23, and right and left HSTs 30 and axle cases 31 constitute a gate-shaped structure defining a space 33 in a lower, transversely middle position. The right and left axle cases 31 are arranged outwardly of the corresponding HSTs 30. This arrangement secures the space 33 between the ground and the body frames 10. The grass collecting duct 6 is disposed to extend through a transversely middle position in the space 33. In this arrangement, the grass collecting duct 6 extends such that the axles 3a of the rear wheels 3 may be substantially aligned with the center of a vertical section of the duct 6. It may be confirmed from FIG. 3 that the drive distributing mechanism 23 and the HSTs 30 are arranged at the same height between upper ends of the right and left axle cases 31.

Figure 2:
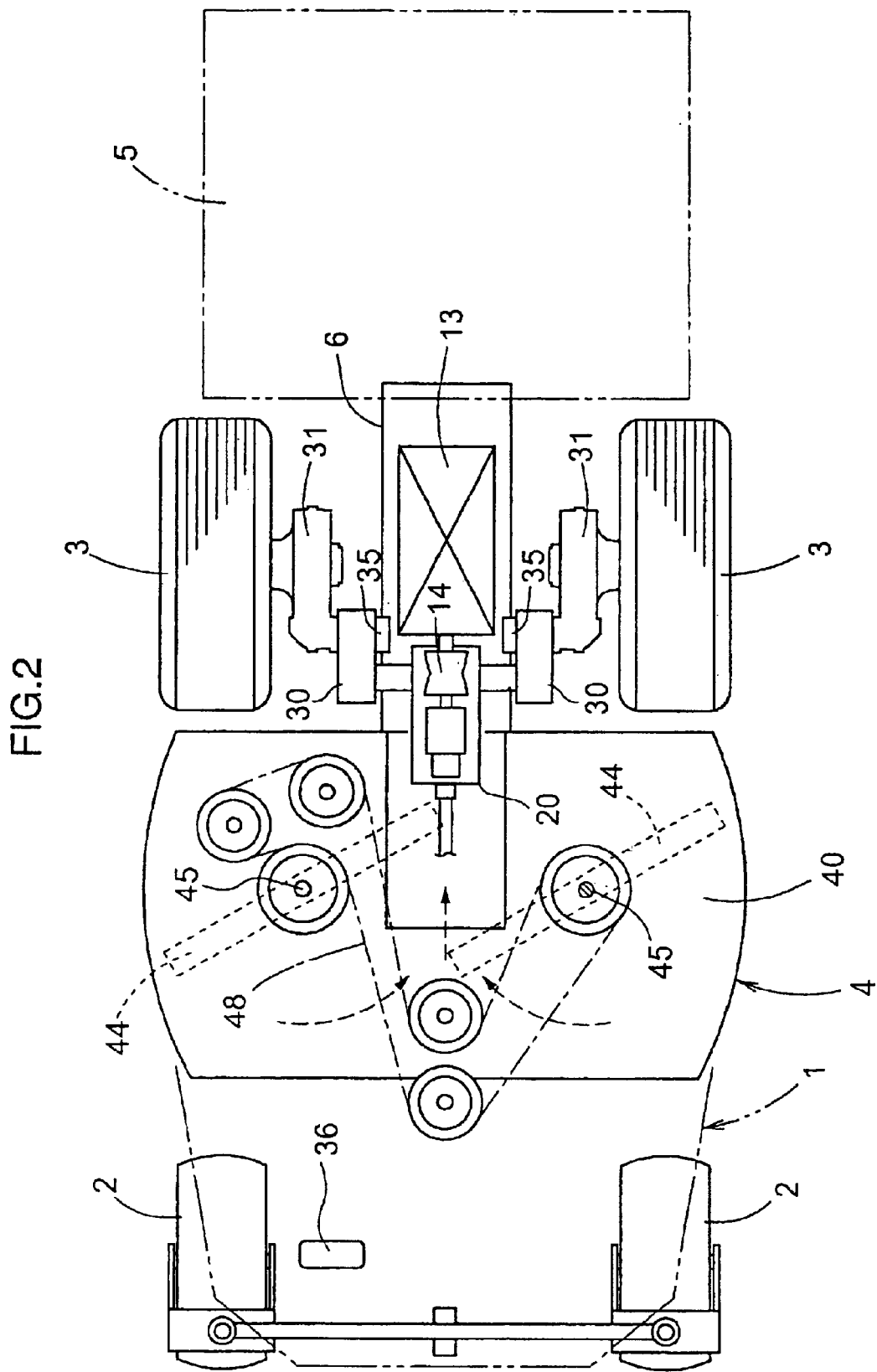
FIG. 2 is a plan view of a principal portion of the lawn mower shown in FIG. 1.

As shown in FIGS. 2 through 4, wet type brakes 35 are disposed inwardly of the right and left HSTs 30 for braking output shafts 34 of the corresponding HSTs 30 to brake the corresponding drive wheels 3, respectively. These right and left wet type brakes 35 are linked to a single brake pedal 36 disposed in a right forward position of the body frames 10.

Numeral 37 in FIG. 4 denotes a gear pump driven by rotation of an intermediate shaft rotatable with the middle one of the three spur gears 22 arranged from the input shafts 21 of the transmission case 20 to the drive distributing mechanism 23.

Figure 5:
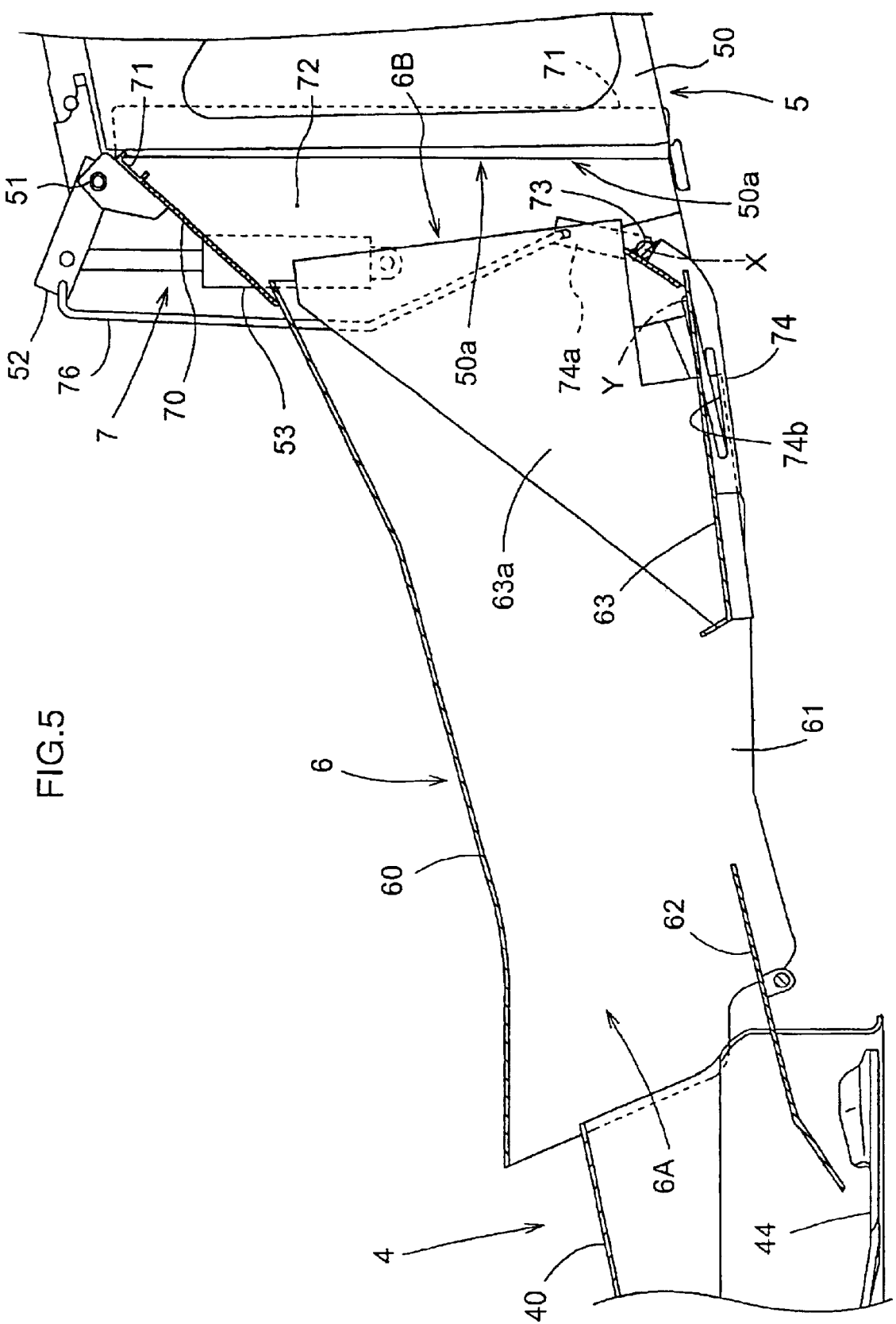
FIG. 5 is a side view in vertical section showing a grass collecting duct.

As shown in FIG. 5, the grass collecting duct 6 basically is a rectangular duct having an upper plate 60 and right and left side plates 61 suspended from lateral ends of the upper plate 60 to define a channel-shaped section opening downward. The duct further has a short front bottom plate 62 at an inlet portion 6A continuous from the discharge opening of the mower unit 4 to cover part of the channel opening. Since the grass clippings guided along the grass collecting duct 6 are entrained by the carrier air flows having an upwardly directing property produced by the blades 44, they are transported rearwardly without falling off even in the absence of the bottom plate. However, the carrier air flows are sometimes agitated at the inlet portion 6A, and thus the front bottom plate 62 is provided for preventing the grass clippings from falling off to the ground. Therefore, in order to remove grass clippings adhering and accumulating on a surface of the bottom plate 62 as appropriate, the bottom plate 62 is manually pivotable to a position in which the surface thereof has a large tilt angle relative to the ground. Similarly, as described in detail later, a rear bottom plate 63 is also provided at an outlet portion 6B of the grass collecting duct 6 leading to the gate-shaped frame 7 acting as a relay member for connecting the grass collecting duct 6 to the grass catcher 5. As seen from FIG. 1, the grass collecting duct 6 is fixed to the body frames 10 and brackets 15 attached to the body frames 10.

As illustrated in FIGS. 1 and 6 through 8, the gate-shaped frame 7 has a rectangular vertical plate 70 and frame plates 71 surrounding the vertical plate 70. The vertical plate 70 forms a passing-through opening 72. The grass catcher 5 has a container body 50 supported by the gate-shaped frame 7 to be vertically pivotable about a transverse support shaft 51 rotatably mounted on the upper frame plate 71. This pivotal construction allows the grass catcher 5 to be pivotable between a grass collecting position in which the container body 50 has an opening 50a opposed to the vertical plate 70 and registering with the passing-through opening 72 of the vertical plate 70, and a grass discharging position in which the opening 50a is opposed to the ground.

The pivotal movement of the grass catcher 5 relative to the gate-shaped frame 7 noted above is hydraulically performed by a hydraulic cylinder 53 pivotably supported at one end thereof by a lower portion of the gate-shaped frame 7 and at the other end thereof by a pivot link 52 fixed to the support shaft 51.

In this embodiment, the gate-shaped frame 7 is connected to the vehicle body 1 through a vertically movable link mechanism 8. The vertically movable link mechanism 8 includes upper arms 80 and lower arms 81 extending parallel to each other from right and left upper ends of a rollover protective frame 16 erected on the vehicle body 1 to lower portions of the gate-shaped frame 7 to form a four-point parallel link mechanism, and hydraulic cylinders 82 extending between the rollover protective frame 16 and the lower arms 81. The hydraulic cylinders 82 are operable to vertically move the gate-shaped frame 7, and hence the grass catcher 5 pivotably supported by the gate-shaped frame 7, between a low level position corresponding to the height of the outlet portion 6B of the grass collecting duct 6 and a high level position above the deck of a truck. In the low level position, the outlet portion 6B of the grass collecting duct 6 and the opening 50a of the container body 50 are generally opposed to each other. The vertical plate 70 of the gate-shaped frame 7 is positioned at a boundary between the outlet portion 6B and the opening 50a so that the grass clippings transported from the grass collecting duct 6 through the passing-through opening 72 of the vertical plate 70 may reach the grass catcher 5.

The rear bottom plate 63 noted above forming a bottom wall of the outlet portion 6B of the grass collecting duct 6 is pivotable to allow the surface thereof to have a large tilt angle relative to the ground with pivotal movement of the grass catcher 5 from the grass collecting position to the grass discharging position. A construction for pivotal movement of the bottom plate 63 will be described hereinafter.

Figure 9:
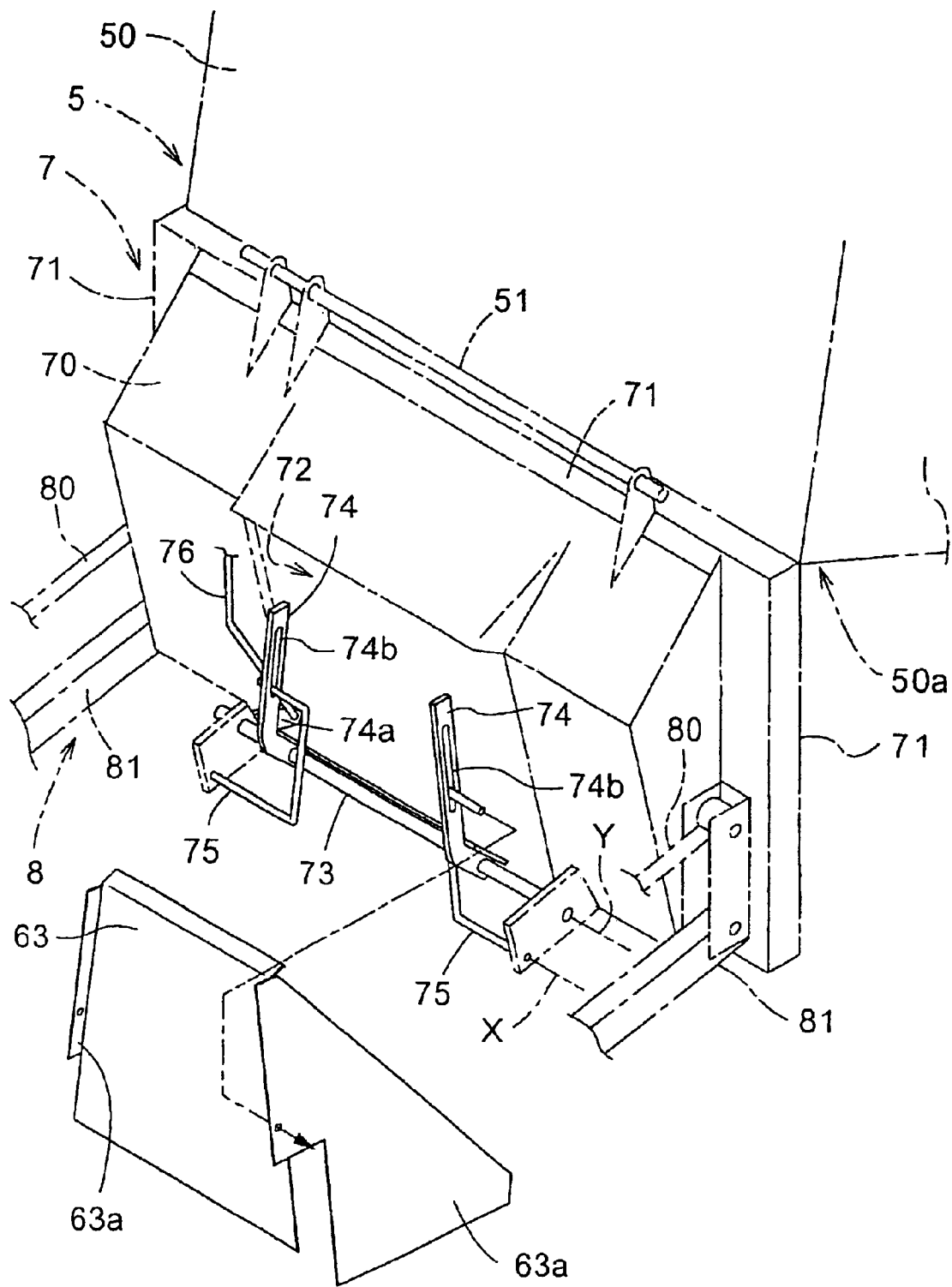
FIG. 9 is a perspective view of the bottom plate and the gate-shaped frame.
Figure 10:
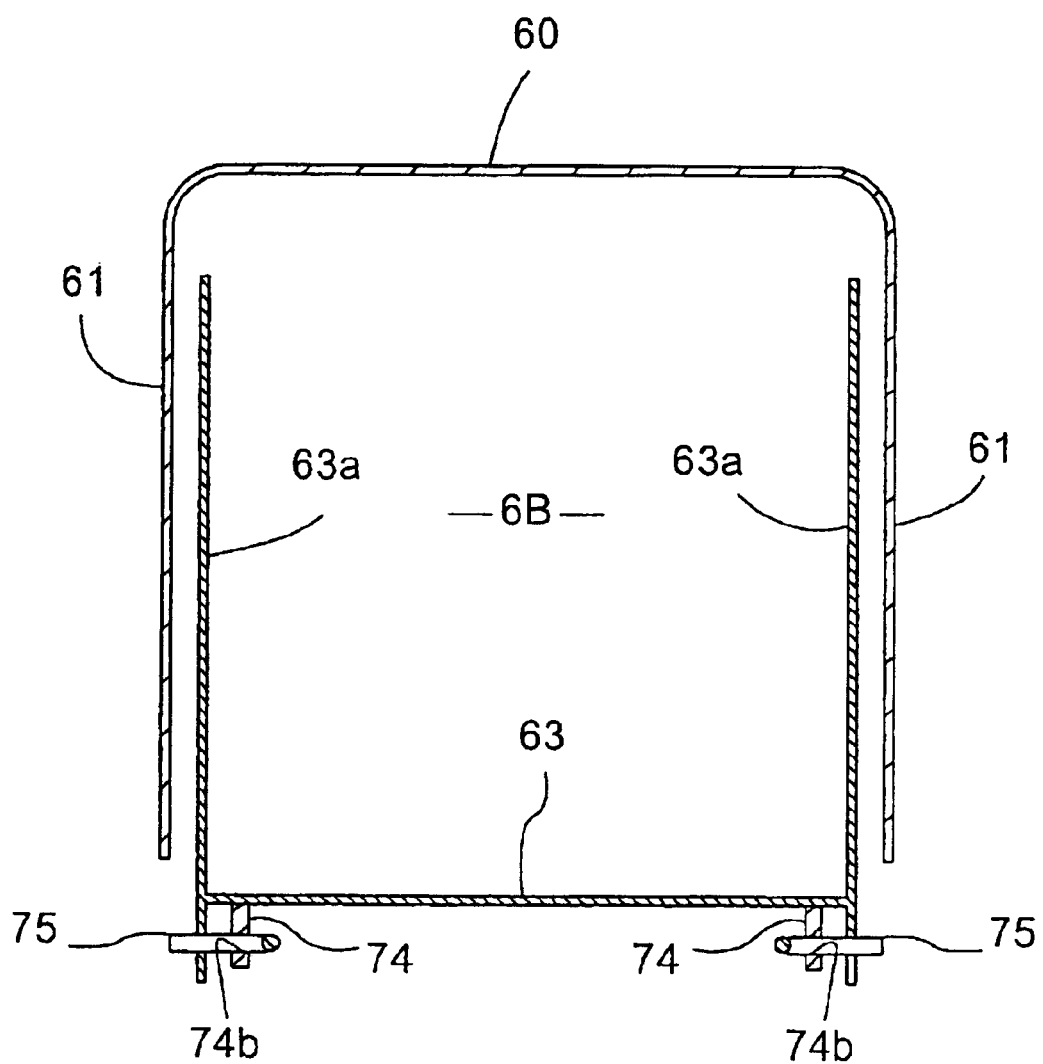
FIG. 10 is a cross sectional view of an outlet portion of the grass collecting duct.

As schematically shown in FIGS. 9 and 10, the bottom plate 63 has webs 63a of a generally right-angled triangle shape provided at opposite sides thereof to prevent grass clippings adhering and accumulating on the surface of the bottom plate 63 from inadvertently falling off lateral sides of the plate. The bottom plate 63 having a channel construction defining an upward opening in combination with the webs 63a is arranged, when in a horizontal position, to be fitted in a channel construction defining a downward opening of the outlet portion 6B of the grass collecting duct 6.

Figure 6:
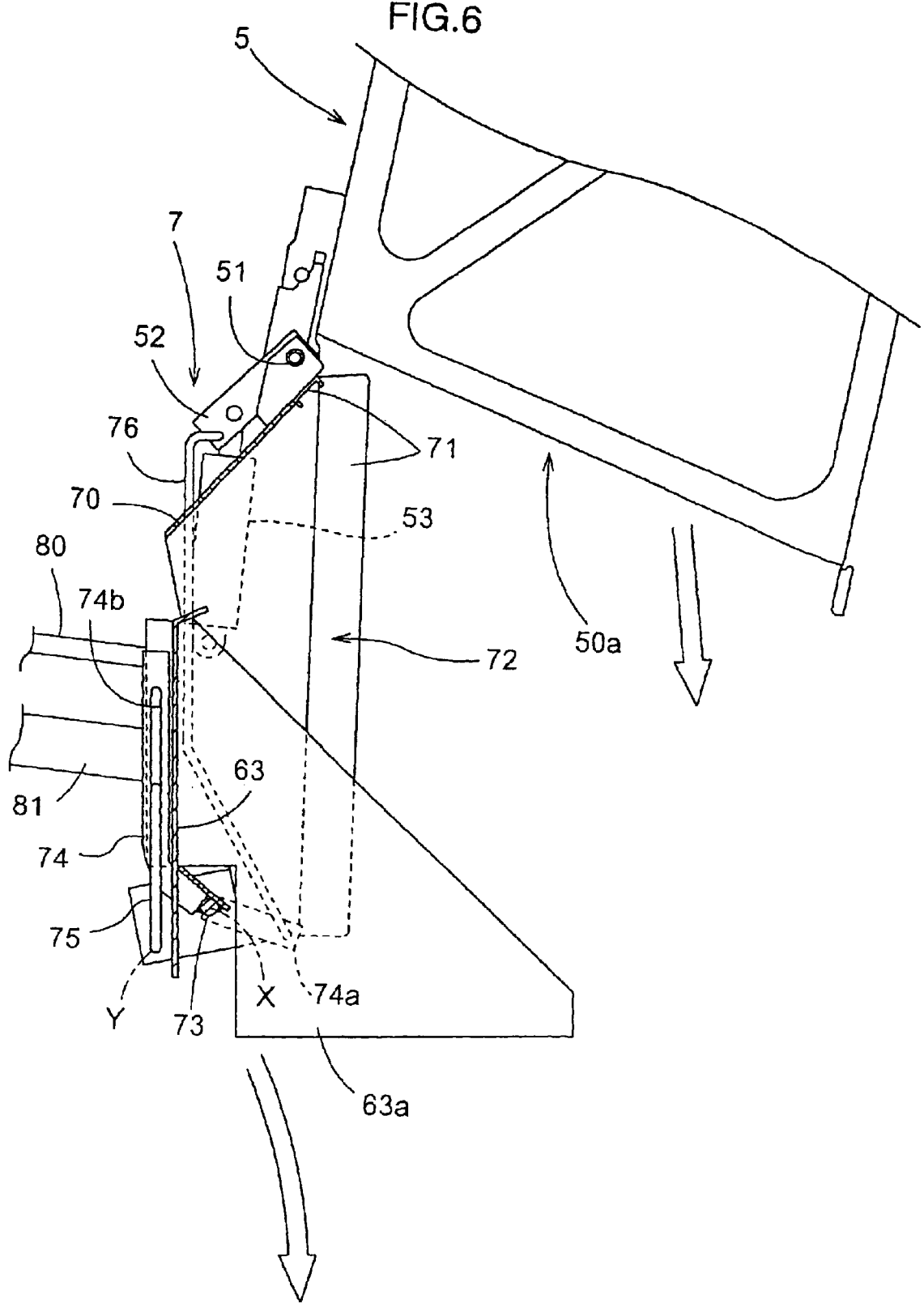
FIG. 6 is a side view of a gate-shaped frame.
Figure 7:
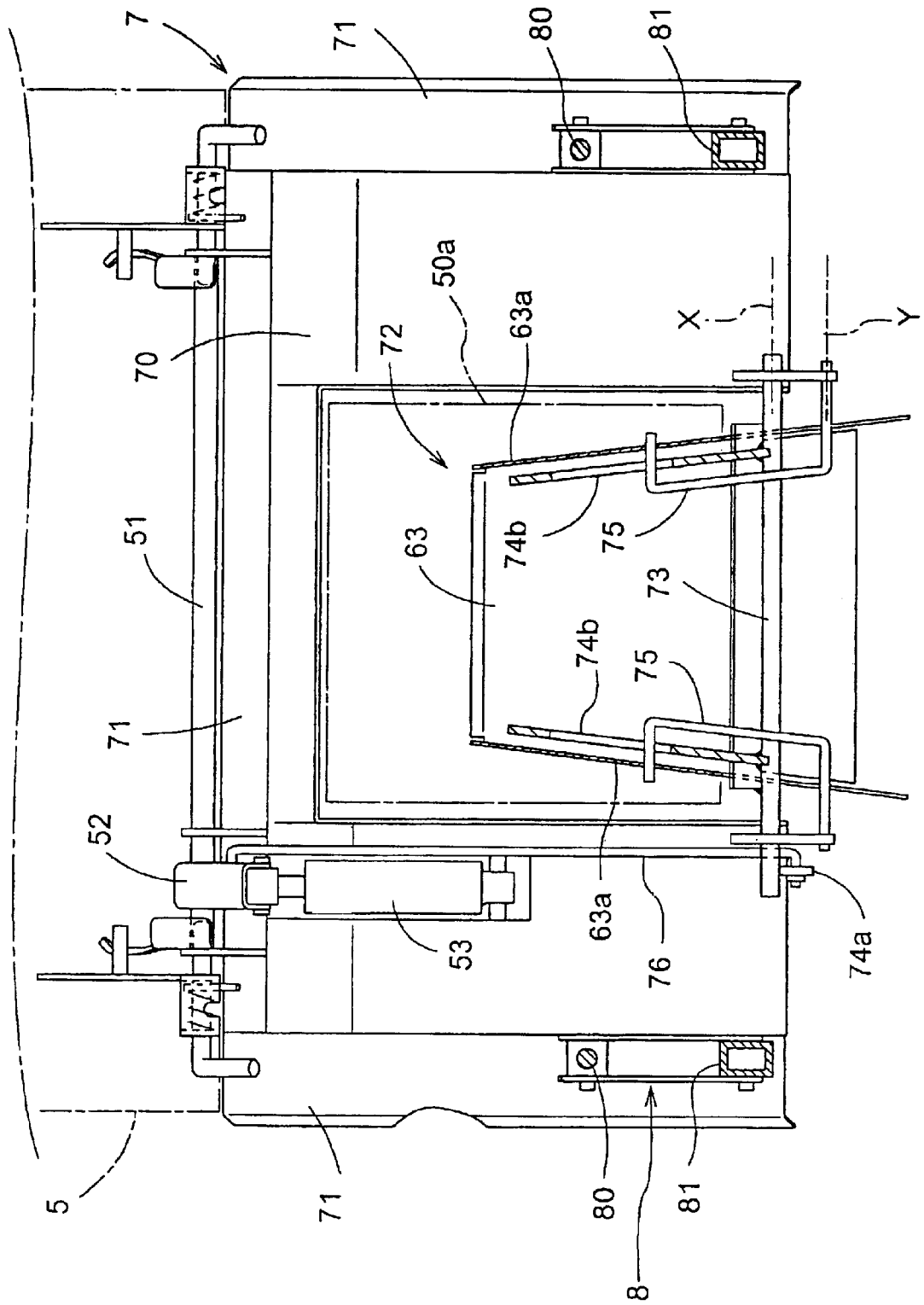
FIG. 7 is a rear view showing the gate-shaped frame and a bottom plate in a grass clippings removing position.
Figure 8:
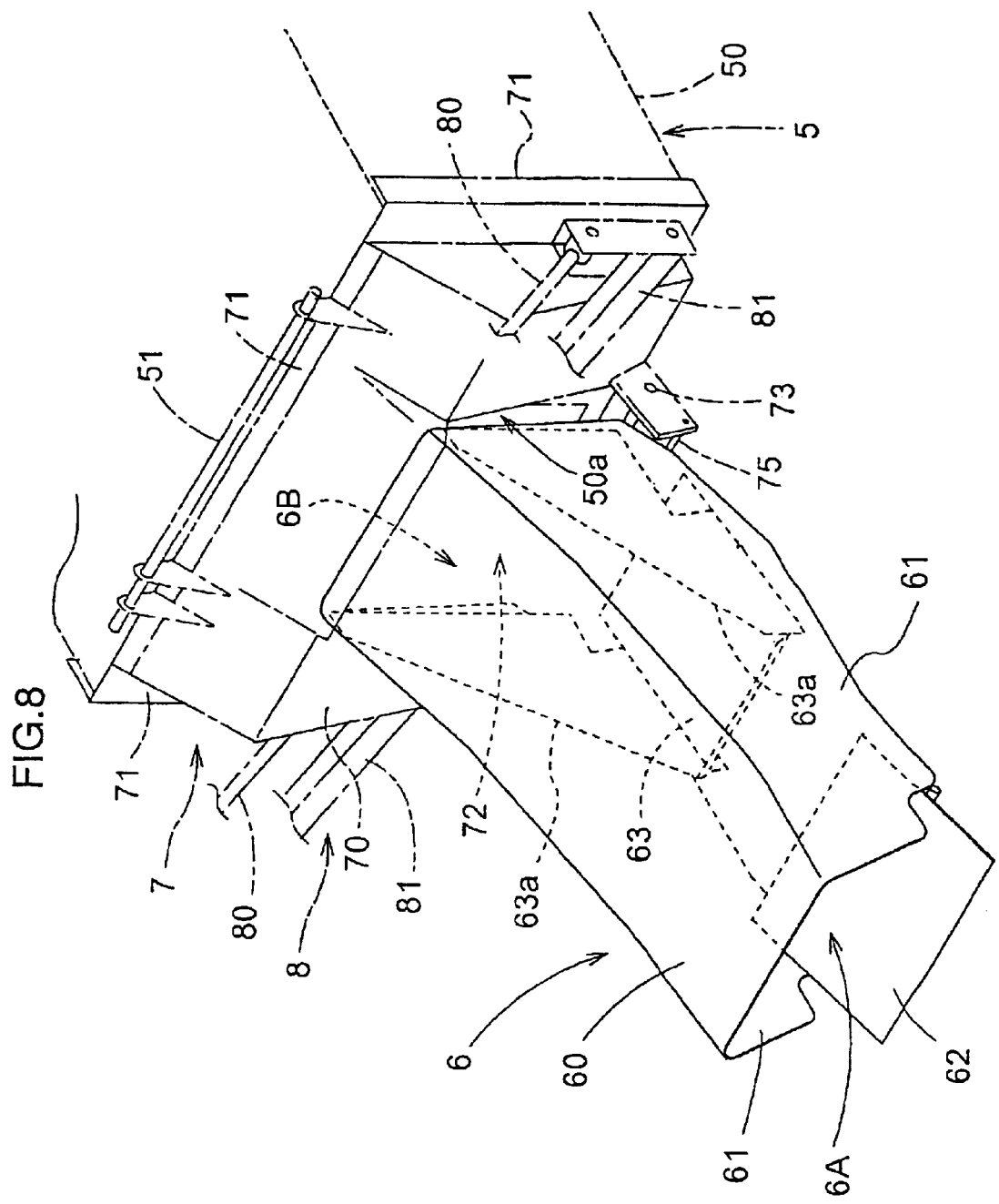
FIG. 8 is a side view showing the grass collecting duct, a grass catcher and the gate-shaped frame in a grass clippings collecting position.

As apparent from FIGS. 6, 7 and 10, the bottom plate 63 is maintained in place with a back surface thereof received by pivotable arms 74 fixed to a transverse pivot shaft 73 mounted on a lower portion of the gate-shaped frame 7. Further, the bottom plate 63 is connected to the gate-shaped frame 7 through link rods 75 each having one end extending through a slot 74b formed in a distal end area of the pivotable arm 74 and inserted into a bore formed in a lower end portion of the web 63a of the bottom plate 63 thereby to pivotably support the web 63a and hence the bottom plate 63, and the other end pivotally connected to a lower portion of the gate-shaped frame 7. As apparent from FIG. 7, each link rod 75 is a U-shaped round bar member having a bend portion for pivotally connecting with the gate-shaped frame 7, a straight portion extending parallel to the pivotable arm 74, and a further bend portion extending through the elongated slot 74b of the pivotable arm 74 to be pivotably connected to the web 63a of the bottom plate 63. Each pivotable arm 74 has an extension 74a remote from the bottom plate 63 across the transverse pivot shaft 73. The extension 74a is operatively connected to the pivot link 52 through a connecting rod 76.

As best understood from FIG. 11, in order to swing the grass catcher 5 from the grass collecting position to the grass discharging position, the hydraulic cylinder 53 is operable to swing the pivot link 52 counterclockwise (with respect to FIG. 11) to push down the connecting rod 76, thereby to swing the pivotable arms 74 clockwise (with respect to FIG. 11). This clockwise movement of the pivotable arms 74 moves the bottom plate 63 placed thereon, under a restriction imposed by the link rods 75. At that time, the bottom plate 63 also swings with the pivotal movement of the pivotable arms 74. Such swinging movement of the bottom plate 63 is limited by the link rods 75 pivotally connected to the webs 63a of the bottom plate 63. Thus, the bottom plate 63 is pivotable about a pivotal connecting point (Y) between the link rods 75 and the gate-shaped frame 7 with a relative sliding movement between the pivotable arms 74 and the back surface of the bottom plate 63 and movement of the bend portions of the link rods 75 within slots 74b of the pivotable arms 74. The pivotal connecting point (Y) acting as a pivotal axis of the bottom plate 63 is positioned lower than an axis (X) of the transverse pivot shaft 73 acting as a pivotal axis of the pivotable arms 74. The lower position of the pivotal axis (Y) of the bottom plate 63 prevents the end of the plate from interfering with the upper plate 60 of the grass collecting duct 6 even if the bottom plate 63 has an increased length. This characteristic feature is important since an increase in the length of the bottom plate 63 would enhance the ability to receive falling grass clippings in an area of transition from the grass collecting duct 6 to the grass catcher 5.

According to the construction of the grass catcher 5 and bottom plate 63 pivotably supported by the gate-shaped frame 7 noted above, with respect to the gate-shaped frame 7, the grass catcher 5 is swung from the grass collecting position to the grass discharging position, and at the same time the bottom plate 63 is also swung from a grass clippings guiding position, where the plate surface generally corresponds to a direction of transporting grass clippings, to a grass clippings removing position where the plate surface has a large tilt angle relative to the ground. More particularly, the grass clippings accumulated in the grass catcher 5 are discharged while the grass clippings received on the bottom plate 63 are also discharged. This arrangement is particularly advantageous because the grass clippings sometimes falling off the opening 50a of the container body 50 are prevented from scattering around by being received by the bottom plate 63 raised integrally with the gate-shaped frame 7 when the grass catcher 5 is raised from the position level with the grass collecting duct 6 in time of high-dumping for discharging the grass clippings from the grass catcher 5 to the deck of a truck.

In this embodiment, the grass catcher 5 and the bottom plate 63 acting as a receiving plate for grass clippings are pivotably attached to the gate-shaped frame 7 supported by the vehicle body 1 through the vertically movable link mechanism 8 to be swung by the common hydraulic cylinder 53. Therefore, the gate-shaped frame 7 may be raised, as appropriate, depending on a level of the grass clippings dumping area, through the vertically movable link mechanism 8, thereby to reliably discharge accumulated grass clippings from an appropriate height to the grass clippings dumping area.

(Other Embodiments)

Modified embodiments of the present invention will be listed below.

Figure 12:
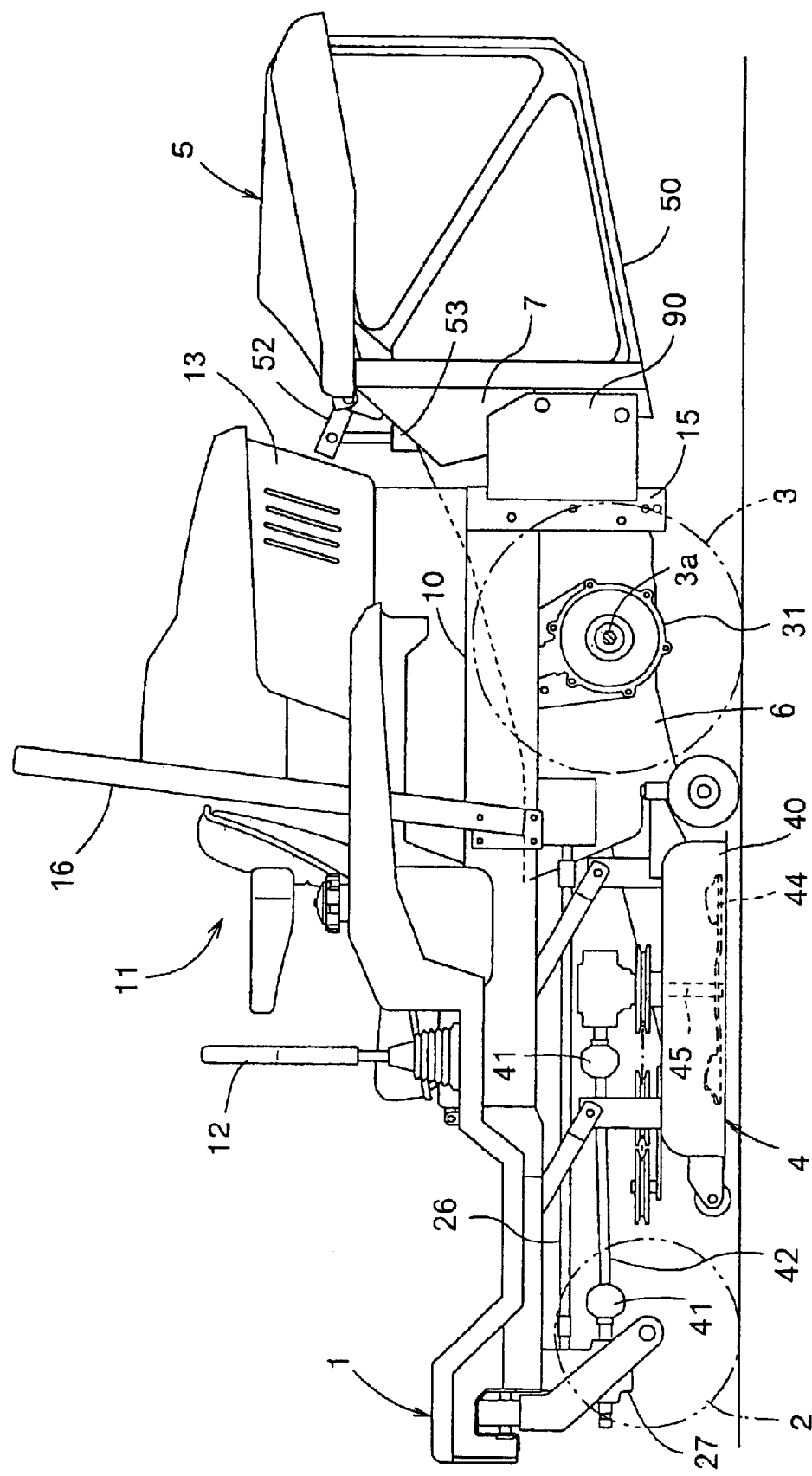
FIG. 12 is a side elevation of the lawn mower including the gate-shaped frame fixed directly to a vehicle body.

(1) In the foregoing embodiment, the gate-shaped frame 7 is attached to the vehicle body 1 through the vertically movable link mechanism 8. Instead, as shown in FIG. 12, the gate-shaped frame 7 may be attached directly to the vehicle body 1 using gate-shaped frame attaching brackets 90 if high-dumping is not required. In this case, the vertically movable link mechanism 8 may be omitted.

(2) In the foregoing embodiment, among the upper plate 60, side plates 61 and bottom plate 63 forming the outlet portion 6B of the grass collecting duct 6, only the bottom plate 63 is independent of the other plates and pivotably attached to the gate-shaped frame 7. Instead, the upper plate 60, side plates 61 and bottom plate 63 may be integrally formed at the outlet portion 6B of the grass collecting duct 6 to be separated from the grass collecting duct 6 and pivotably attached to the gate-shaped frame 7. In this case, the side plates 61 act as the webs 63a, which can dispense with the webs 63a.

(3) In the foregoing embodiment, the pivotal axis (Y) of the bottom plate 63 is positioned lower than the pivotal axis (X) of the pivotable arms 74 to prevent the end portion of the bottom plate 63 from interfering with the upper plate 60 of the grass collecting duct 6 in time of pivotal movement even if the bottom plate 63 has an increased length. Even when a bottom plate 63 with an increased length is employed or the upper plate 60 at the outlet portion 6B is lowered, in order to prevent the end portion of the bottom plate 63 from interfering with the upper plate 60 of the grass collecting duct 6, the pivotal axis (Y) of the bottom plate may be adapted to move downward with a pivotal movement toward the grass clippings removing position. Such a construction may be realized by attaching the link rods 75 to the gate-shaped frame 7 through pivotable brackets pivotable downward by a pivotal movement of the pivotable arms 74.

(4) The present invention may be applied to any working vehicles such as a sweeper for use in collecting grass clippings left in a working area in time of mowing operations, or a front-mount type mower having the mower unit 4 mounted at the front of the vehicle body 1.

What is claimed is:

1. A grass collecting apparatus for directing grass clippings cut by a mower unit to a grass catcher, the apparatus comprising:
    a grass collecting duct for guiding the grass clippings from the mower unit to the grass catcher, the duct having an outlet portion leading to the grass catcher defined by an upper plate, right and left side plates and a bottom plate;
    a gate-shaped frame disposed in a boundary between the outlet portion of the grass collecting duct and an opening of the grass catcher, the gate-shaped frame having an upper edge and a lower edge, wherein a first axis for swinging the grass catcher extends in association with the upper edge of the gate-shaped frame, and a second axis for tilting the bottom plate extends in association with the lower edge of the gate-shaped frame; and
    a swing mechanism for swinging the grass catcher about the first axis between a grass collecting position with the opening of the grass catcher being opposed to the gate-shaped frame and a grass discharging position with the opening of the grass catcher being directed downward, the bottom plate being tilted about the second axis toward the gate-shaped frame when the grass catcher is swung about the first axis from the grass collecting position to the grass discharging position.

2. A grass collecting apparatus as defined in claim 1, wherein the swing mechanism further swings the bottom plate to be interlocked to swinging of the grass catcher from the grass collecting position to the grass discharging position.

3. A grass collecting apparatus as defined in claim 1, wherein the gate-shaped frame has a passing-through opening, through which the opening of the grass catcher in the grass collecting position communicates with the outlet portion of the grass collecting duct.

4. A grass collecting apparatus as defined in claim 1, wherein the swing mechanism includes an actuator pivotably supported at one end thereof by a lower portion of the gate-shaped frame and at an other end thereof by a pivot link fixed to the grass catcher for swinging the grass catcher about the first axis.

5. A grass collecting apparatus as defined in claim 4, wherein the swing mechanism further includes a connecting rod fixed at one end thereof to the pivot link and at an other end thereof to a tilt mechanism for tilting the bottom plate about the second axis.

6. A riding-type lawn mower including a grass collecting apparatus extending along a fore and aft direction of a vehicle body for directing grass clippings cut by a mower unit to a grass catcher, the grass collecting apparatus comprising:
    a grass collecting duct for guiding the grass clippings from the mower unit to the grass catcher, the duct having an outlet portion leading to the grass catcher defined by an upper plate, right and left side plates and a bottom plate;
    a gate-shaped frame disposed in a boundary between the outlet portion of the grass collecting duct and an opening of the grass catcher, the gate-shaped frame having an upper edge and a lower edge, wherein a first axis for swinging the grass catcher extends in association with the upper edge of the gate-shaped frame, and a second axis for tilting the bottom plate extends in association with the lower edge of the gate-shaped frame; and
    a swing mechanism for swinging the grass catcher about the first axis between a grass collecting position with the opening of the grass catcher being opposed to the gate-shaped frame and a grass discharging position with the opening of the grass catcher being directed downward, the bottom plate being tilted about the second axis toward the gate-shaped frame when the grass catcher is swung about the first axis from the grass collecting position to the grass discharging position;
    wherein the mower unit is mounted forwardly of rear wheels, the gate-shaped frame is disposed at a rear portion of the vehicle body, and the grass catcher protrudes rearwardly from the vehicle body.

7. A riding-type lawn mower as defined in claim 6 further including a vertically movable link mechanism for vertically moving the gate-shaped frame with the grass catcher relative to the vehicle body.

8. A riding-type lawn mower as defined in claim 6, wherein the gate-shaped frame is fixed to body frames.

9. A riding-type lawn mower as defined in claim 6, wherein the swing mechanism further swings the bottom plate to be interlocked to swinging of the grass catcher from the grass collecting position to the grass discharging position.

10. A grass collecting apparatus as defined in claim 6, wherein the swing mechanism includes an actuator pivotably supported at one end thereof by a lower portion of the gate-shaped frame and at an other end thereof by a pivot link fixed to the grass catcher for swinging the grass catcher about the first axis.

11. A grass collecting apparatus as defined in claim 10, wherein the swing mechanism further includes a connecting rod fixed at one end thereof to the pivot link and at an other end thereof to a tilt mechanism for tilting the bottom plate about the second axis.

12. A riding-type lawn mower comprising:

a vehicle body having front and rear wheels;

a mower unit mounted forwardly of the rear wheels for cutting grass;

a grass catcher disposed at a rear portion of the vehicle body for collecting grass clippings from said mower unit; and a grass collecting duct for guiding the grass clippings from the mower unit to the grass catcher;

wherein a bottom plate is disposed at a portion for connecting the mower unit and the grass catcher;

a link mechanism is provided for supporting the grass catcher such that the grass catcher can be raised from its grass collecting position;

when the link mechanism raises the grass catcher, the bottom plate is raised along with the grass catcher while remaining oriented in a direction of transporting the grass clipping; and when the grass catcher raised by the link mechanism is pivoted, the plate surface of the bottom plate is tilted to discharge the grass clippings received thereon.

13. A riding-type lawn mower as defined in claim 12, wherein the mower unit is mounted forwardly of rear wheels, and the grass catcher protrudes rearwardly from the vehicle body.

14. A riding-type lawn mower as defined in claim 12, wherein the bottom plate has right and left webs standing erect to prevent the grass clippings from falling off lateral sides of the bottom plate.

15. A riding-type lawn mower as defined in claim 12, wherein:

a frame stands erect from the vehicle body;

the link mechanism is formed into a four-point parallel link mechanism including the frame, upper arm and a lower arm; and a hydraulic cylinder is disposed between the lower link and a lower portion of the frame, wherein extension and contraction of the hydraulic cylinder raises and lowers the link mechanism.

* * * * *